United States Patent [19]

Joiner, Jr.

[11] 4,076,897

[45] Feb. 28, 1978

[54] LOW LAG LUMINESCENT PHOSPHORS AND X-RAY SCREEN CONTAINING THE SAME

[75] Inventor: James Ray Joiner, Jr., Wilmington, Del.

[73] Assignee: E. I. Du Pont de Nemours and Company, Wilmington, Del.

[21] Appl. No.: 777,320

[22] Filed: Mar. 14, 1977

Related U.S. Application Data

[63] Continuation of Ser. No. 637,953, Dec. 5, 1975, abandoned.

[51] Int. Cl.$^2$ ............................................. C09K 11/46
[52] U.S. Cl. .................................... 428/539; 250/483; 252/301.4 H
[58] Field of Search ................ 252/301.4 H; 428/539; 250/483, 460

[56] References Cited

U.S. PATENT DOCUMENTS

| | | | |
|---|---|---|---|
| 2,303,917 | 12/1942 | Dietz | 252/301.4 H |
| 2,303,963 | 12/1942 | Uhle | 252/301.4 H |
| 3,163,610 | 12/1964 | Yocum | 252/301.4 H |
| 3,693,006 | 9/1972 | Chenot | 252/301.4 H X |
| 3,951,848 | 4/1976 | Wolfe et al. | 252/301.4 H |
| 4,028,550 | 6/1977 | Weiss et al. | 250/483 |

FOREIGN PATENT DOCUMENTS 7,206,945  11/1973  Netherlands.

OTHER PUBLICATIONS

Stevels, "Medicamundi," vol. 20, No. 1, (1975), pp. 12–22.

Stevels et al., "Philips Research Report," vol. 30, No. 5, pp. 277–290, Oct. 1975.

Dai–Nippon–"Derwent Abstract," 1977.

*Primary Examiner*—Jack Cooper

[57] ABSTRACT

The addition of potassium or ribidium salts to europium-activated fluorohalide phosphors produces X-ray screens with low lag even at very low europium concentrations.

3 Claims, No Drawings

LOW LAG LUMINESCENT PHOSPHORS AND X-RAY SCREEN CONTAINING THE SAME

This is a continuation of application Ser. No. 637,953 filed Dec. 5, 1975, now abandoned.

BACKGROUND OF THE INVENTION

This invention relates to luminescent phosphor compositions useful in preparing X-ray screens, cathode ray tubes and the like, and particularly to high efficiency luminescent phosphor compositions having reduced lag.

Luminescent phosphor compositions useful, for example, in preparing radiographic X-ray screens have been described extensively in the prior art. Recently, a number of so-called "high efficiency" phosphors have been developed which are activated by rare earths. These rare earth-activated phosphors suffer from various deficiencies, one of which is delayed fluorescence or "lag". This prior art is broadly discussed by Stevels in Medicamundi, Vol. 20, #1, 1975 pp. 12–22. Europium-activated fluorohalides (e.g. BaFCl:Eu) are included within this group of high efficiency phosphors. Lag is a particularly common deficiency among the europium-activated fluorohalides.

Lag is continued screen emission after excitation with X-rays has been discontinued. In roentgenology uses, excess lag cannot be tolerated since exposed screens used in this application can cause exposure of fresh photographic films. This is a particular problem in the modern X-ray facility where high speed machines are used which automatically place fresh film in contact with the X-ray screen immediately following exposure. Thus, the fresh film can be exposed even when contacted with a screen made from phosphors having relatively short lag. Of course, screens made from phosphors which exhibit longer lag cannot be tolerated even with manual changing of the film.

Various methods to surmount the problem of lag have been tried. One method has been to mix additives with the phosphor composition but these tend to discolor the phosphor or reduce its over-all output. Another method, in the case of rare earth activation, is to add larger amounts of the rare earth to the composition to reduce the lag. Rare earths are, however, expensive so that this solution to the problem is uneconomical.

SUMMARY OF THE INVENTION

It is an object of this invention to provide rare earth-activated alkali fluorohalide phosphors with reduced lag and improved properties. This is achieved by adding potassium or rubidium salts to a luminescent composition of the formula $Ba_{1-(x+y)}Eu_xSr_yFQ$, wherein Q is Br, Cl or I, $x$ is 0.0001 to 0.2, and $y$ is 0 to 0.8 (molar amounts). The potassium (K) or rubidium (Rb) salts are added to said luminescent composition at a level of at least 0.001 weight percent (w/o) of said luminescent composition. A particularly preferred luminescent composition within this invention is $Ba_{0.98}Eu_{0.02}FCl$ with 0.1 weight percent KCl added. The fact that lag is reduced within this luminescent composition by the addition of K or Rb salts is completely surprising.

DETAILED DESCRIPTION OF THE INVENTION

X-ray phosphor compositions of the type $Ba_{1-(x+y)}Eu_xSr_yFCl$ wherein Ba is responsible for X-ray absorption and Eu is responsible for blue emission, are known in the art. Luminescent screens prepared from these highly efficient phosphors exhibit increased stopping power accompanied by an unusual degree of optical efficiency provided by the Eu activator. Even at concentrations as low as 1/10 atom percent of Eu (i.e. $Ba_{1-x}Eu_xClF$, were x=.001), these compositions offer, for example, an X-ray speed equivalent to conventional $CaWO_4$ phosphor while still providing an increased stopping power. For maximum efficiency it is preferred that the concentration of Eu shall be 1 to 20 atomic percent of the cation sites. However, as previously stated, these highly efficient luminescent compositions exhibit a high degree of lag.

The inventor has found that this problem can be overcome by adding potassium or rubidium salts to the other component salts of the phosphor composition, after which the resulting composition is then intimately mixed by, for example, ball or vibrating mills. This milling step is preferably carried out in an organic solvent, though aqueous milling may be used. The resulting suspension is dried and fired at elevated temperatures, as is well-known to the art. The fired phosphor thus formed is then ground or washed (to remove soluble materials), particle size adjusted, and is then suitable for any number of uses. The end product will always show the presence of $K^+$ or $Rb^+$ therein.

For X-ray screens, the phosphor may be mixed with a suitable binder and coated from solution on a suitable support. Screen preparation and the like are well-known procedures in the prior art. These phosphors may also find utility in other applications such as in cathode ray tubes and the like.

The exact mechanism by which potassium or rubidium ions enter into the reaction product and act to reduce lag within the phosphor compositions is not completely understood. Since $K^+$ and $Rb^+$ are present in the final composition as measured by, for example, atomic absorption, this method is distinguished from soluble fluxes and indicates that $K^+$ and $Rb^+$ are retained in the crystal lattice. Normal raw materials of the compositions described show no detectable $K^+$ or $Rb^+$ by analysis and thus the presence of these ions within the final structure must be due to the procedures described.

Potassium and rubidium can be added in any easily obtainable form such as the halide, the hydroxide, the carbonate, nitrate, etc. Potassium halide is preferred (e.g. KF, KCl, KBr, KI) because it is efficient and cheap.

In X-ray screen applications the support can be paper or a metal foil, e.g. aluminum, but is preferably composed of an macromolecular, hydrophobic organic polymer. Suitable polymeric supports include cellulose derivatives, e.g., cellulose acetate, cellulose propionate, cellulose acetate butyrate, ethyl cellulose; polyethylene, polyvinyl chloride, poly(vinyl chloride co vinyl acetate); vinylidene chloride, vinyl acetate, acrylonitrile, styrene and isobutylene; polystyrene and polyesters, e.g. polyethylene terephthalates and homologous polyesters obtainable by the process described in Whinfield et al, U.S. Pat. No. 2,465,319. Polyethylene terephthalate films are particularly useful because of their dimensional stability. A particularly useful support is biaxially oriented polyethylene terephthalate coated with a subbing layer of vinylidene chloride-methylacrylate-itaconic acid copolymer as described in Alles et al, U.S. Pat. No. 2,779,684. The thickness of the support may be any-where from about 0.0025 in. to 0.03 in. (0.0064 cm. to 0.0762 cm.), with 0.01 in. (0.0254 cm.) being preferred.

The support or film base, moreover, may contain or be coated with dyes or finely divided pigments, e.g. carbon black and colored pigments, e.g. tartrazine (C.I. No. 640), Victoria Green W.B. Base (C.I. No. 800) and Nubian Resin Black (C.I. No. 864), as opacifying or light absorbing agents. In addition, the base support may be metallized to provide reflective action, e.g. the polyethylene terephthalate base can be coated with a thin layer of aluminum, etc. The above mentioned dyes and pigments are particularly useful in reflective layers to vary the light output or block unwanted wavelengths.

A reflective layer may be interposed between the support and the phosphor layer. These reflective layers include pigments such as $TiO_2$. Preferably, the reflective layer of this invention includes equal amounts of $TiO_2$ and $K_2O(TiO_2)_6$ mixed in a binder. A suitable and preferred binder is described in Example 1 of Brixner et al, U.S. Pat. No. 3,895,157 which also teaches the preparation of the referenced $K_2O(TiO_2)_6$. The reflective layer can be from about 0.0003 in. to about 0.001 in. ((0.0007 cm. to 0.00254 cm.) or more in thickness.

A protective top coat made according to any of the teachings of the prior art may be applied over the phosphor layer. These top coats can be cellulose nitrate or acetate or a mixture of resins comprising poly(methylmethacrylate), poly(isobutyl methacrylate) and a vinyl chloride/vinyl acetate copolymers as taught by Patten, U.S. Pat. No. 2,907,882. A top coat such as that taught in U.S. Pat. No. 3,895,157 is particularly efficacious. The top coat layer can be from about 0.0001 in. to 0.005 in. (0.0003 cm. to 0.013 cm.) in thickness.

The phosphor is usually dispersed in a suitable binder (e.g. polyvinyl butyral or a chlorosulfonated olefin) along with suitable dispersing agents, solvents and the like. This procedure is described in U.S. Pat. No. 3,895,157. The phosphor layer may be from about 0.001 in. to 0.02 in. (0.0025 cm. to 0.051 cm.) thick, and is preferably about 0.004 in. (0.0102 cm.) to 0.014 in. (0.036 cm.) thick when dry. The ratio of binder to phosphor may vary as desired.

This invention will now be illustrated by the following specific examples:

EXAMPLE 1

A luminescent composition was prepared by milling the following ingredients:

| | |
|---|---|
| $BaCl_2$ | 54.51 g. |
| $BaF_2$ | 36.72 g. |
| $EuF_3$ | 5.48 g. |
| $SrF_2$ | 3.29 g. |
| KCl | 1.00 g. |

These ingredients were milled in an organic solvent for about 4 hours on a vibrating mill. Much of the solvent was removed by filtration and the solids dried for 40 hours at 160° C. in an air vented oven. The dried luminescent composition was then fired in a refractory boat for 15 minutes at 880° C. under a nitrogen atmosphere in a tube furnace. This fired material in the form of a sintered block was then ground until the material passed a 325 mesh sieve.

From this the following mixture was then prepared:

| | |
|---|---|
| Luminescent Composition | 3.75g. |
| Binder Material | 2.54g. |
| (Ex. 1, U.S. Pat. No. 3,895,157) | |
| n-Butyl Acetate | 1.00ml. |

The mixture was shaken on a Spex shaker for 15 minutes to thoroughly mix all ingredients and then coated immediately on a suitable white pigmented cardboard support using a mechanical coater equipped with a 0.01 in. (0.0254 cm.) drawdown knife. The resulting coating was air-dried, yielding a dried screen thickness of about 0.004 in. (0.0102 cm.). For control purposes a second screen using an identical phosphor composition without potassium chloride was prepared and coated as described above.

To test the "lag" of these compositions, the screens prepared above were placed in a suitable cassette along with a piece of high speed medical X-ray photographic film and given a 2 second exposure at 200 ma and 80kVp at a distance of 25 in. (63.5 cm.) from a G.E. Tungsten X-ray source.

The overexposed film was then removed and a fresh portion of the same film held in contact with the excited screen for 5 minutes. The time which elapsed in replacing the overexposed film was controlled at 15 seconds. The unexposed film which had been in contact with the excited screen was then machine processed in a conventional X-ray developer and fixer in a total time of 90 seconds (develop-fix-wash and dry). Any density appearing on the processed film was due to the amount of lag present in the screen. The following data were obtained.

| SAMPLE | NET LAG DENSITY* |
|---|---|
| Control | 0.19 |
| Control and KCl | 0.00 |

*This amount of density is equivalent to optical density above the net base plus fog density of completely unexposed film itself.

With the exception of lag, all other X-ray screen properties of the two samples described above were essentially identical.

EXAMPLE 2

The luminescent composition of Example 1 was prepared with various other additives at 1 w/o based on the total luminescent composition as shown below. Screens were made and tests conducted as described in Example 1 with the following results:

| Sample | Additive | Net Lag Density |
|---|---|---|
| A-Control | None | 0.19 |
| B | LiCl | 0.29 |
| C | LiP | 2.31 |
| D | NaCl | 1.63 |
| E | NaF | 1.46 |
| D | KCl | 0.00 |
| E | KF | 0.02 |

Only the potassium cation served to reduce lag.

EXAMPLE 3

A europium-activated luminescent composition without strontium was prepared. Ingredients for milling were as follows:

| | |
|---|---|
| $BaCl_2$ | 53.82 g. |

-continued

| | |
|---|---|
| BaF$_2$ | 40.78 g. |
| EuF$_3$ | 5.40 g. |

Various other additives were included at 1 w/o, based on the total luminescent composition, as shown below. Screens were prepared in each case as taught in Example 1 and each screen was tested in the same manner. The following results were obtained:

| Sample | Additive | Net Lag Density |
|---|---|---|
| A-Control | None | 0.16 |
| B | NaCl | 1.47 |
| C | AgCl | 0.15 |
| D | KCl | 0.00 |
| E | NH$_4$Cl | 0.41 |
| F | RbI | 0.02 |
| G | CsCl | 0.66 |

EXAMPLE 4

Example 3 was repeated using a variety of potassium salts at the 1 w/o level based on the luminescent compositions. All other conditions were as previously described. The following results were obtained:

| Sample | Additive | Lag Density |
|---|---|---|
| A-Control | None | 0.16 |
| B | KCl | 0.00 |
| C | KBr | 0.00 |
| D | KF | 0.00 |
| E | KI | 0.00 |
| F | KNO$_3$ | 0.00 |
| G | KCO$_3$ | 0.00 |
| H | KOH | 0.00 |

Thus potassium can be added to the phosphor in almost any form and still achieve a reduction in lag.

EXAMPLE 5

The luminescent composition of Example 3 was prepared and potassium chloride was added at various levels. Screens were then made from each sample and tested as described in Example 1. The following results were obtained:

| Sample | w/o of KCl | Lag Density |
|---|---|---|
| A-Control | 0 | 0.18 |
| B | 0.01 | 0.10 |
| C | 0.1 | 0.04 |
| D | 1 | 0.00 |
| E | 10 | 0.00 |

At 10 w/o level of potassium chloride a noticeable decrease in X-ray screen speed was noted.

EXAMPLE 6

A luminescent composition having a lower molar concentration of europium was prepared. Ingredients charged to the mill were as follows:

| | |
|---|---|
| BaCl$_2$ | 54.10 g. |
| BaF$_2$ | 43.73 g. |
| EuF$_3$ | 2.17 g. |

This charge is calculated to produce a composition with the following formula:

Ba$_{0.98}$Eu$_{0.02}$FCl

Potassium chloride was also added during the milling step at various levels and screens were made and tested as described in Example 1 with the following results:

| Sample | Lag Density |
|---|---|
| A-Control - no KCl | 0.97 |
| B - 0.1 w/o KCl | 0.00 |
| C - 1 w/o KCl | 0.00 |

EXAMPLE 7

Example 6 was repeated but at a lower level of europium. Ingredients charged to the mill were as follows:

| | |
|---|---|
| BaCl$_2$ | 54.20 g. |
| BaF$_2$ | 44.71 g. |
| EuF$_3$ | 1.09 g. |

This charge is calculated to produce a composition with the following formula:

Ba$_{0.99}$Eu$_{0.01}$FCl

Potassium chloride was also added at the milling step at various levels and screens were made and tested as described in Example 1 with the following results:

| Sample | Lag Density |
|---|---|
| A-Control (no KCl) | 1.31 |
| B-0.01 w/o KCL | 0.51 |
| C-0.1 w/o KCl | 0.08 |
| D-1 w/o KCl | 0.00 |

Both Example 6 and Example 7, when compared to Example 3, also demonstrate that increased levels of europium serve to reduce lag. These Examples also prove that the expensive additive europium can be replaced with additives which are much cheaper and yet achieve further lag reduction and equivalent screen properties when used as X-ray screens, for example.

The novel fluorescent compositions containing the K or Rb salts of this invention are particularly useful for preparing X-ray screens. When used for preparing fluorescent screens they are particularly useful for medical and industrial radiography, e.g. miniature radiographic screens, fluoroscopy, and the like, and in industrial monitoring systems. This invention provides high quality highly efficient phosphors without deleterious side effects.

I claim:

1. A luminescent phosphor of the formula Ba$_{1-(x+y)}$Eu$_x$Sr$_y$FQ wherein

Q = Br, Cl, or I x = 0.0001 to 0.2, and y = 0 to 0.8 and wherein the crystal structure of the phosphor contains potassium or rubidium ions in an amount sufficient to reduce lag.

2. An X-ray screen comprising the phosphor of claim 1 mixed with a binder and coated upon a support.

3. The X-ray screen of claim 2 wherein the phosphor is Ba$_{0.98}$Eu$_{0.02}$FCl and its crystal structure contains sufficient potassium ions to reduce lag.

* * * * *